United States Patent
Park

(10) Patent No.: US 10,416,951 B2
(45) Date of Patent: Sep. 17, 2019

(54) DISPLAY APPARATUS AND CONTROL METHOD THEREOF

(71) Applicant: SAMSUNG ELECTRONICS CO., LTD., Suwon-si, Gyeonggi-do (KR)

(72) Inventor: Sang-jun Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 57 days.

(21) Appl. No.: 15/349,596

(22) Filed: Nov. 11, 2016

(65) Prior Publication Data

US 2017/0139664 A1    May 18, 2017

(30) Foreign Application Priority Data

Nov. 12, 2015   (KR) .................. 10-2015-0158531

(51) Int. Cl.
| | | |
|---|---|---|
| *G06F 3/14* | (2006.01) | |
| *G06F 3/147* | (2006.01) | |
| *H01R 24/60* | (2011.01) | |
| *G09G 3/20* | (2006.01) | |
| *G06F 3/0482* | (2013.01) | |
| *H01R 107/00* | (2006.01) | |

(52) U.S. Cl.
CPC ............ *G06F 3/1446* (2013.01); *G06F 3/147* (2013.01); *G06F 3/1431* (2013.01); *G09G 3/20* (2013.01); *H01R 24/60* (2013.01); *G06F 3/0482* (2013.01); *G09G 2300/026* (2013.01); *G09G 2356/00* (2013.01); *G09G 2370/04* (2013.01); *H01R 2107/00* (2013.01)

(58) Field of Classification Search
None
See application file for complete search history.

(56) References Cited

U.S. PATENT DOCUMENTS

| 6,046,709 A * | 4/2000 | Shelton ................ G06F 3/1446 345/1.1 |
|---|---|---|
| 2002/0163513 A1 | 11/2002 | Tsuji |
| 2003/0191850 A1 | 10/2003 | Thornton |

(Continued)

FOREIGN PATENT DOCUMENTS

| EP | 0 498 995 A2 | 8/1992 |
|---|---|---|
| EP | 0 933 753 | 1/1999 |

(Continued)

OTHER PUBLICATIONS

International Search Report dated Mar. 9, 2017 in corresponding International Patent Application No. PCT/KR2016/012950, 3 pp.

(Continued)

*Primary Examiner* — Joseph R Haley
(74) *Attorney, Agent, or Firm* — Staas & Halsey LLP

(57) ABSTRACT

A display apparatus, which has an input port and an output port for connection with at least one among a plurality of display apparatuses that constitute a video wall, and easily updates setting information by exchanging the setting information with a display apparatus connected by the input port and regarded as a master display apparatus and a display apparatus connected by the output port and regarded as a slave display apparatus, and a control method thereof. Thus, the setting information for the plurality of display apparatus connected together can be synchronized much easily.

20 Claims, 13 Drawing Sheets

(56) References Cited

U.S. PATENT DOCUMENTS

| | | |
|---|---|---|
| 2009/0109125 A1 | 4/2009 | Young et al. |
| 2010/0115406 A1 | 5/2010 | Kim |
| 2014/0068520 A1 | 3/2014 | Missig et al. |
| 2015/0254045 A1* | 9/2015 | Drake .................. G06F 3/1446 345/1.3 |
| 2015/0287390 A1* | 10/2015 | Kakeko ................ G06F 3/1446 345/1.1 |

FOREIGN PATENT DOCUMENTS

| | | |
|---|---|---|
| KR | 10-2013-0010657 | 1/2013 |
| WO | 2013/158772 A1 | 10/2013 |

OTHER PUBLICATIONS

Written Opinion of the International Search Authority dated Mar. 9, 2017 in corresponding International Patent Application No. PCT/KR2016/012950, 5 pp.
European Supplementary Partial Search Report in Application No. 16864582.8 dated Aug. 1, 2018 (15 pages).
European Search Report in Application No. 16864582 dated Dec. 12, 2018 (16 pages).

* cited by examiner

DISPLAY APPARATUS AND CONTROL METHOD THEREOF

CROSS-REFERENCE TO RELATED APPLICATIONS

This application claims priority benefit from Korean Patent Application No. 10-2015-0158531, filed on Nov. 12, 2015 in the Korean Intellectual Property Office, the disclosure of which is incorporated herein by reference.

BACKGROUND OF THE INVENTION

1. Field of the Invention

Apparatuses and methods consistent with exemplary embodiments relate to a display apparatus, which is used as one element of a video wall including a plurality of display apparatuses that are sequentially connected together, and a control method thereof, and more particularly to a display apparatus, which has a structure for more easily and conveniently synchronizing setting information between a plurality of display apparatuses that are sequentially connected together and a control method thereof.

2. Description of the Related Art

A display apparatus processes an image signal/image data, which is received from the external source or stored therein, through various processes, and displays an image on a display panel or screen. The display apparatus may be variously achieved by a television (TV), a monitor, a portable media player, etc.

To show an image to users who are located away from the image such as in public places or nearby doors, a large screen may be required. To this end, a display apparatus having a large panel may be used. However, it may be difficult to use a single panel for achieving such a large screen if technology, costs, circumstances or the like factors are taken into account. In this case, a plurality of display apparatuses may be arranged in the form of a matrix to make a display system. Such a display system is called a video wall.

The plurality of display apparatuses respectively have set values previously stored for displaying images, and are thus likely to display images having characteristics different in accordance with the set values. If the display apparatuses are different in an image output delay, a color tone and brightness in accordance with the set values while displaying an image, they have different performances in outputting an image signal, thereby having low quality of the whole output. Therefore, a conventional video wall system is very inconvenient since the plurality of display apparatuses have to be checked and adjusted one by one with respect to their set values while the video wall system is installed.

SUMMARY OF THE INVENTION

An aspect of one or more exemplary embodiments may provide a display apparatus, which has an input port and an output port for connection with at least one among a plurality of display apparatuses that constitute a video wall, and easily updates setting information by exchanging the setting information with a display apparatus connected by the input port which is referred to as a master display apparatus and a display apparatus connected by the output port and referred to as a slave display apparatus, and a control method thereof.

According to an aspect of an exemplary embodiment, there is provided A display apparatus used for a video wall formed by a plurality of display apparatuses that are sequentially connected to one another, the display apparatus comprising: a communicator comprising an output port to which a first display apparatus of the plurality of display apparatuses is connectable and an input port to which a second display apparatus of the plurality of display apparatuses is connectable, the communicator configured to receive an image signal of the video wall from the second display apparatus through the input port and transmits the image signal to the first display apparatus through the output port so that the image signal is sequentially transmitted for the plurality of display apparatuses of the video wall; a storage configured to store setting information of the display apparatus to display an image of the video wall; a signal processor configured to process the received image signal from the second display apparatus based on the stored setting information; a display configured to display the image of the video wall based on the processed image signal; and a controller configured to designate the first display apparatus as a slave display apparatus if it is detected that the first display apparatus is connected to the output port and control the communicator to transmit first master setting information based on the stored setting information to the slave display apparatus, and designate the second display apparatus as a master display apparatus if it is detected that the second display apparatus is connected to the input port and update the stored setting information with second master setting information received from the master display apparatus.

The setting information may include information about at least one of image quality, a delay in image processing and color calibration of a display panel. Thus, it is possible to synchronize various pieces of setting information for the plurality of display apparatuses that are sequentially connected together.

The setting information may include position information about a relative arranged position of the display apparatus in the video wall, and the controller may control the signal processor to process the image signal to display a part of the image of the video wall image based on the position information. Thus, the display apparatus forms a part of the video wall image.

The controller may control the first master setting information based on the stored setting information to be selectively transmitted to the first display apparatus if it is detected that the first display apparatus is connected to the output port. Although the signal line is physically connected to the output port, the master setting information is selectively transmitted in accordance with the setting information, thereby considering a user's intention.

The setting information may include information about a transmission condition, and the controller may determine whether to transmit the first master setting information based on the information about the transmission condition. Thus, the transmission condition of whether to transmit the first master setting information or not is introduced.

The controller may control the display to display a first user interface (UI) with menu items related to the transmission condition, and set the transmission condition in accordance with a user's input using the first UI. Thus, a user is allowed to set the transmission condition, thereby improving usability for a user.

The controller may control the display to display a second UI with a menu item for asking a user whether to transmit the first master setting information, if it is detected that the first display apparatus is connected to the output port and the transmission condition is set not to automatically transmit the first master setting information. Although the signal line is physically connected to the output port, a user is asked for approval to the transmission in accordance with the transmission condition, thereby considering a user's intention.

The controller may control the communicator to make a first communication request to the first display apparatus if it is detected that the first display apparatus is connected to the output port, designates the first display apparatus as the slave display apparatus if a first communication approval is received through the communicator, and transmit the first master setting information to the slave display apparatus. Thus, the process of setting the slave display apparatus after the physical connection is introduced.

The controller may designate the second display apparatus as the master display apparatus and controls the communicator to transmit a second communication approval to the master display apparatus, if it is detected that the second display apparatus is connected to the input port and a second communication request is received from the second display apparatus through the communicator. Thus, the process of setting the master display apparatus after the physical connection is introduced.

The first communication request and the second communication request may include a part of the first master setting information and a part of the second master setting information, respectively. Thus, the slave display apparatus can determine whether to approve of the transmission by analyzing a part of the setting information involved in the communication request.

The controller may compare the second master setting information and the stored setting information, and update the stored setting information with the second master setting information if it is determined that the second master setting information is different from the stored setting information. Thus, it is possible to skip the unnecessary update process.

The controller may compare the second master setting information and the stored setting information, and determine that the second master setting information and the stored setting information are different if a different between the second master setting information and the stored setting information is greater than a first critical range. Thus, it is possible to skip the unnecessary update process since the stored setting information is updated by taking the difference into account.

The controller may compare the second master setting information and the stored setting information, and transmit first error information based on the stored setting information to the master display apparatus if the difference is greater than a second critical range. Thus, it is possible to correct an error that occurs in the master display apparatus.

The controller may update the stored setting information with the second error information if second error information is received from the slave display apparatus through the communicator. Thus, it is possible to make a recovery based on the information received from the slave display apparatus if an error occurs.

According to an aspect of another exemplary embodiment, there is provided a method of controlling a display apparatus which is used for a video wall formed by a plurality of display apparatuses that are sequentially connected to one another, the display apparatus comprising an output port to which a first display apparatus of the plurality of display apparatuses is connectable and an input port to which a second display apparatus of the plurality of display apparatuses is connectable, the method comprising: storing setting information of the display apparatus to display an image of the video wall; processing an image signal received from the second display apparatus based on the stored setting information; displaying the image of the video wall based on the processed image signal; designating the first display apparatus as a slave display apparatus if it is detected that the first display apparatus is connected to the output port and transmitting first master setting information based on the stored setting information to the slave display apparatus; and designating the second display apparatus as a master display apparatus if it is detected that the second display apparatus is connected to the input port and updating the stored setting information with second master setting information received from the master display apparatus.

The setting information may include information about at least one of image quality, a delay in image processing and color calibration of a display panel. Thus, it is possible to synchronize various pieces of setting information for the plurality of display apparatuses that are sequentially connected together.

The setting information may include position information about a relative arranged position of the display apparatus in the video wall, and the displaying the image of the video wall may include processing the image signal to display a part of the image of the video wall image based on the position information. Thus, the display apparatus forms a part of the video wall image.

The transmitting the first master setting information may include: selectively transmitting the first master setting information based on the stored setting information to the first display apparatus if it is detected that the first display apparatus is connected to the output port. Although the signal line is physically connected to the output port, the master setting information is selectively transmitted in accordance with the setting information, thereby considering a user's intention.

The setting information may include information about a transmission condition, and the selectively transmitting the first master setting information may include: determining whether to transmit the first master setting information based on the information about the transmission condition. Thus, the transmission condition of whether to transmit the first master setting information or not is introduced.

The determining whether to transmit the first master setting information based on the information about the transmission condition may include: displaying a first user interface (UI) with menu items related to the transmission condition; and setting the transmission condition in accordance with a user's input using the first UI. Thus, a user is allowed to set the transmission condition, thereby improving usability for a user.

The determining whether to transmit the first master setting information based on the information about the transmission condition may include: displaying a second UI with a menu item for asking a user whether to transmit the first master setting information, if it is detected that the first display apparatus is connected to the output port and the transmission condition is set not to automatically transmit the first master setting information. Although the signal line is physically connected to the output port, a user is asked for approval to the transmission in accordance with the transmission condition, thereby considering a user's intention.

The transmitting the first master setting information may include: making a first communication request to the first display apparatus if it is detected that the first display apparatus is connected to the output port; and regarding the first display apparatus as the slave display apparatus if a first communication approval is received and transmitting the first master setting information to the slave display apparatus. Thus, the process of setting the slave display apparatus after the physical connection is introduced.

The updating the stored setting information may include: regarding the second display apparatus as the master display apparatus and transmitting a second communication approval to the master display apparatus, if it is detected that the second display apparatus is connected to the input port and a second communication request is received from the second display apparatus. Thus, the process of setting the master display apparatus after the physical connection is introduced.

The first communication request and the second communication request may include a part of the first master setting information and a part of the second master setting information, respectively. Thus, the slave display apparatus can determine whether to approve of the transmission by analyzing a part of the setting information involved in the communication request.

The updating the stored setting information may include: comparing the second master setting information and the stored setting information; and updating the stored setting information with the second master setting information if it is determined that the second master setting information is different from the stored setting information. Thus, it is possible to skip the unnecessary update process.

The comparing the second master setting information and the stored setting information may include: determining that the second master setting information and the stored setting information are different if a different between the second master setting information and the stored setting information is greater than a first critical range. Thus, it is possible to skip the unnecessary update process since the stored setting information is updated by taking the difference into account.

The comparing the second master setting information and the stored setting information may include: transmitting first error information based on the stored setting information to the master display apparatus if the difference is greater than a second critical range. Thus, it is possible to correct an error that occurs in the master display apparatus.

The transmitting the first master setting information may include updating the stored setting information with the second error information if second error information is received from the slave display apparatus. Thus, it is possible to make a recovery based on the information received from the slave display apparatus if an error occurs.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF THE PREFERRED EMBODIMENTS

Below, exemplary embodiments will be described in detail with reference to accompanying drawings so as to be easily realized by a person having an ordinary skill in the art. The present inventive concept may be embodied in many different forms, and not limited to the following embodiments. Portions unrelated to the descriptions are omitted for clarity, and like numerals refer to like elements throughout.

Figure 1:
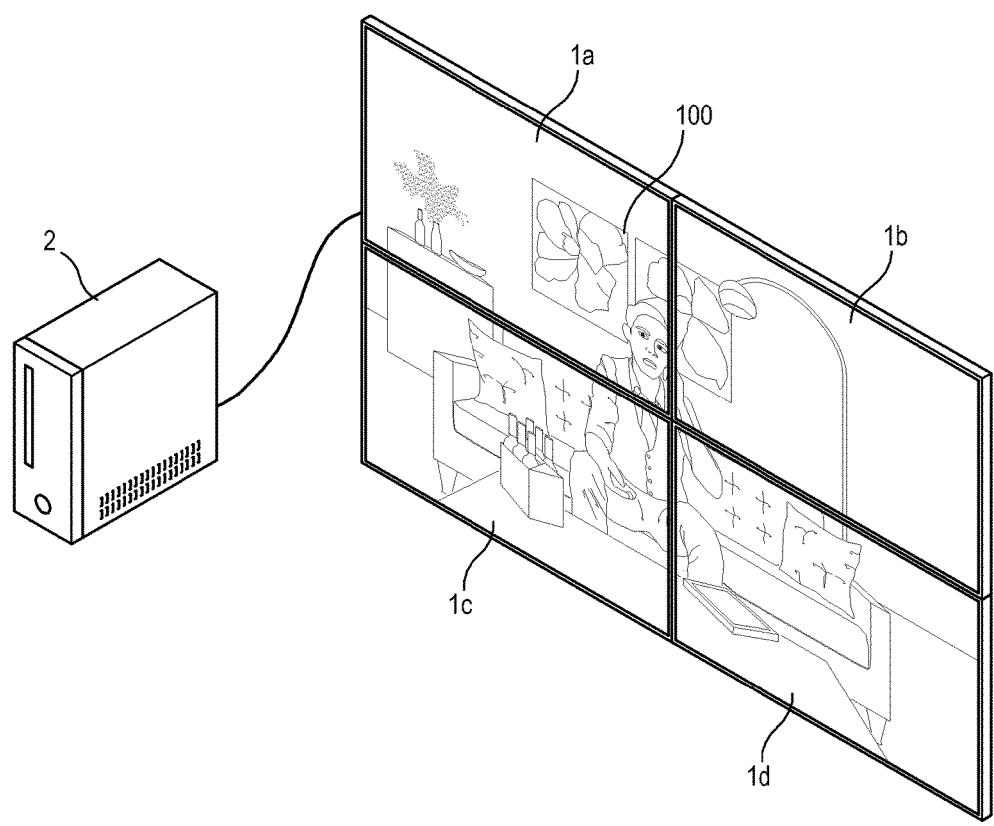
FIG. 1 illustrates a video wall system according to an exemplary embodiment.
Figure 2:
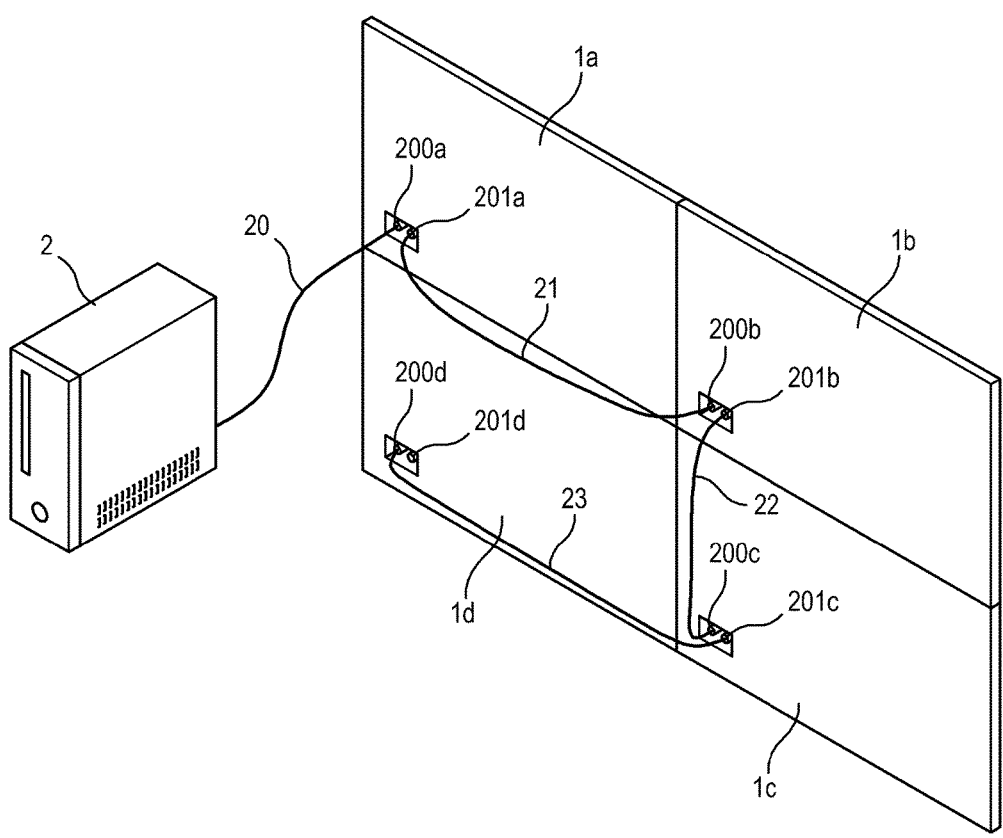
FIG. 2 illustrates a rear side of the video wall system according to an exemplary embodiment.

FIG. 1 and FIG. 2 illustrate a video wall system according to an exemplary embodiment. A plurality of display apparatuses 1a, 1b, 1c and 1d are connected together in sequence and form a video wall, and configured to display a video wall image 100 based on an image signal received from the external device 2.

Each of the display apparatuses 1a, 1b, 1c and 1d is configured to display a part of the video wall image by processing an image signal received based on position information corresponding to a previously stored relative arranged position. The image signals are sequentially transmitted to the connected display apparatuses 1a, 1b, 1c and 1d.

Referring to FIG. 2, the plurality of display apparatuses 1a, 1b, 1c and 1d are sequentially connected together by respective signal lines 20, 21, 22 and 23, and include input port 200a, 200b, 200c and 200d and output ports 201a, 201b, 201c and 201d to connect with the signal lines 20, 21, 22 and 23.

The respective display apparatuses 1a, 1b, 1c and 1d may respectively recognize the display apparatuses 1a, 1b, 1c and 1d connected to the input port 200a, 200b, 200c and 200d as their master display apparatuses, and the display apparatuses 1a, 1b, 1c and 1d connected to the output ports 201a, 201b, 201c and 201d as their slave display apparatuses. For example, the display apparatus 1b is a slave display apparatus to the display apparatus 1a which is a master display apparatus to the display apparatus 1b. Detailed operations of the respective display apparatuses 1a, 1b, 1c and 1d will be described later.

In this exemplary embodiment, it is illustrated and described that the plurality of display apparatuses 1a, 1b, 1c and 1d receive the image signal from the external device 2, but not limited thereto. The first display apparatus 1a receives a broadcast signal and transmits it to the next one of the display apparatuses 1a, 1b, 1c and 1d so that the display apparatuses 1b, 1c and 1d can receive the broadcast signal in sequence. Each of the display apparatuses 1a, 1b, 1c and 1d may display a part of the video wall image based on the position information and the broadcast signal.

Further, the video wall is not limited to the illustrated arrangement and the number of the display apparatuses 1a, 1b, 1c and 1dd. The video wall system according to an exemplary embodiment may include the plurality of display apparatuses 1a, 1b, 1c and 1d, the arrangement and number of which are suitable for the video wall image, as long as they are sequentially connected together.

Figure 3:
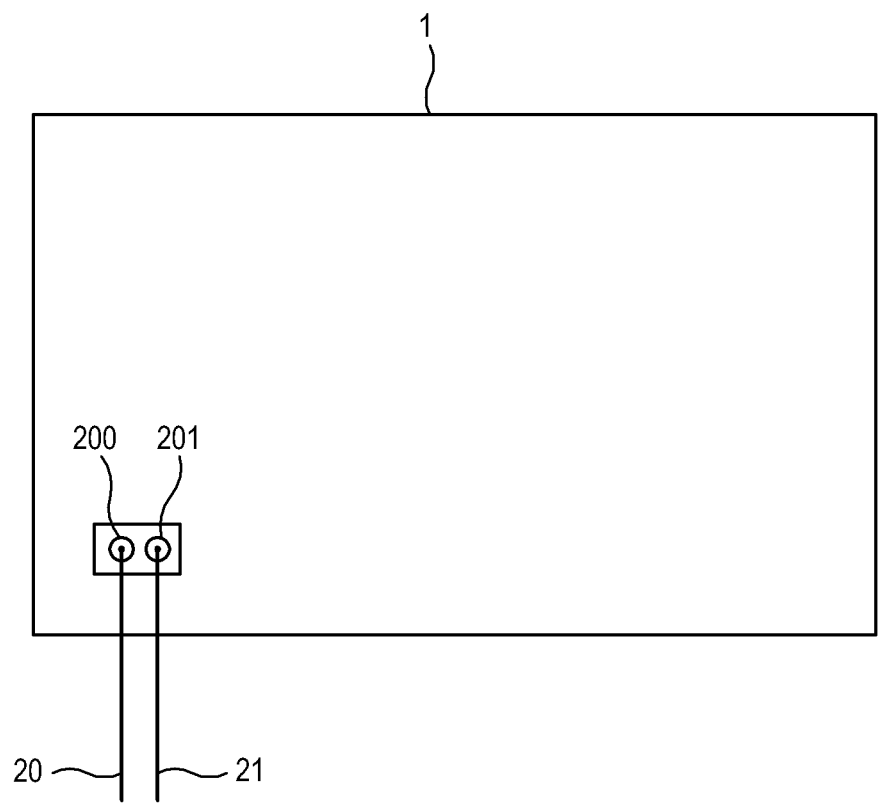
FIG. 3 illustrates a rear side of a display apparatus according to an exemplary embodiment.

FIG. 3 shows a rear side of the display apparatus 1 according to an exemplary embodiment. As described above, the display apparatus 1 may connect with the other display apparatuses 1 through the signal lines 20 and 21 in order to form the video wall. The display apparatus 1 includes an input port 200 to connect with a master display apparatus 1 by a signal line 20, and an output port 201 to connect with a slave display apparatus 1 by a signal line 21.

The input port 200 and the output port 201 are physically separated from each other. When the signal lines 20 and 21 are respectively connected to the input port 200 and the output port 201, the display apparatus 1 changes the setting information based on the setting information received from the master display apparatus 1 connected to the input port 200, and transmits the setting information based on the stored setting information to the slave display apparatus 1 connected to the output port 201.

Figure 4:
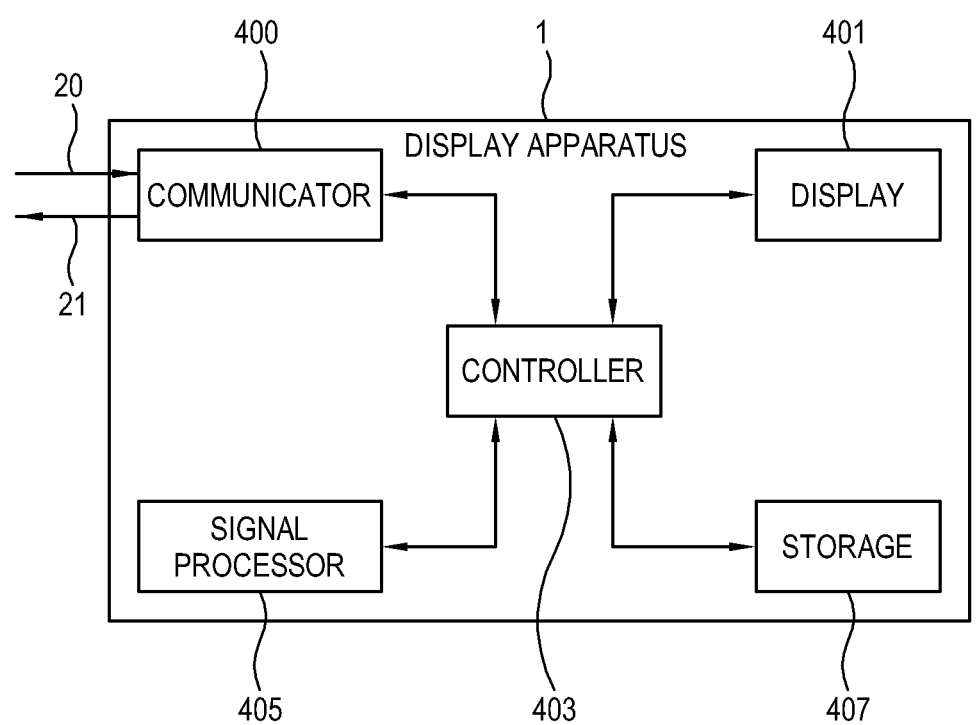
FIG. 4 is a block diagram of the display apparatus according to an exemplary embodiment.

FIG. 4 is a block diagram of the display apparatus according to an exemplary embodiment. The display apparatus 1 is configured to display a part of the video wall image, and receives the setting information from a different display apparatus 1 that is connected with to update the setting information or transmits the setting information to a different display apparatus 1. To this end, the display apparatus 1 according to an exemplary embodiment may include a communicator 400 with the input port 200 and the output port 201, a display 401, a controller 403, a signal processor 405 and a storage 407.

The communicator 400 transmits an image signal and setting information received from the external source to the signal processor 405 and the controller 403, or transmits the setting information from the controller 403 to another display apparatus 1. The communicator 400 includes the input port 200 for connection with the master display apparatus 1, and the output port 201 for connection with the slave display apparatus 1.

The input port 200 and the output port 201 of the communicator 400 may be variously achieved corresponding to formats or types of a signal to be transmitted or received. For example, the input port 200 and the output port 201 may be achieved by connectors having data pins of a signal generated to transmit various image signals based on standards such as high definition multimedia interface (HDMI), digital visual interface (DVI), display data channel (DDC), auxiliary (AUX), etc. The input port 200 and the output port 201 may be achieved by the connectors of the same standards, or by connectors of different standards.

The display 401 displays an image based on a received image signal and the setting information under control of the controller 403. The display 401 may include a display panel and a backlight unit, or may include a self-emissive panel structure.

The storage 407 may be configured to store set values of the display apparatus 1 as the setting information. The storage 407 may be achieved by a nonvolatile memory (e.g. writable read only memory (ROM)) to retain data even though the display apparatus 1 is powered off and reflect changes. That is, the storage 407 may include one of a flash memory, an erasable and programmable read only memory (EPROM), and an electrically erasable and programmable read only memory (EEPROM).

As described above, the setting information may include at least one of information about an image to be displayed, information about a delay in processing an image, information about color calibration for uniformity in brightness and color tone of the display 401, information about an arranged position of the display apparatus 1, information related to a transmission condition of the setting information, and information about a critical range for criterion on whether to change the stored setting information based on the received information.

For example, the display apparatus 1 may be varied in quality of an image to be displayed depending on purposes, places, a user's tastes, etc. The display apparatuses, which constitute the video wall, have to display an image with the same quality so as to improve the quality of the whole image. To this end, an image signal may be processed by an image-quality enhancing integrated chip (IC) to improve quality of an image to be displayed, or may bypass the image-quality enhancing IC to deteriorate the quality of the image. However, the change in the set image quality may have a direct effect on time taken in processing a signal in the display apparatus 1. Therefore, if the display apparatuses 1 are different in quality of images to be respectively displayed, the video wall image is not thoroughly synchronized. In this case, there is a need of synchronization.

Further, the display apparatus 1 may store a calibration coefficient for each pixel in order to make uniformity in optical outputs of the pixels since devices forming the panel of the display 401 are different in optical output properties of such as brightness, color tone, etc. Although the uniformity of the optical output is adjusted in one display apparatus 1, there is a need of adjusting the uniformity of the optical output in connection with another display apparatus 1. Therefore, the color calibration is also required to synchronize with that of another display apparatus 1.

Further, the setting information may include the position information related to the arranged position of each display apparatus 1. The display apparatus 1 may change the position information before transmitting it to the next display apparatus 1.

The signal processor 405 processes a received image signal based on the setting information stored in the storage 407 so that a part of the video wall image can be displayed on the display 401. The signal processor 405 may for example apply modulation, demodulation, multiplexing, demultiplexing, analog-digital conversion, digital-analog conversion, decoding, encoding, image enhancement, scaling or the like image processes to the received image signal. Further, the signal processor 405 may process a user interface (UI), which has menu items for changing the set of the display apparatus 1, to be displayed on the display 401 under control of the controller 403.

The controller 403 is configured to control general operations of the display apparatus 1 according to an exemplary embodiment. In more detail, the controller 403 controls the signal processor 405 to process an image signal to be displayed as a part of the video wall on the display 401 based on the position information contained in the setting information. Further, the controller 403 monitors whether an external device, i.e. another display apparatus 1 for forming the video wall is connected to the input port 200 or the output port 201, controls the communicator 400 to transmit the master setting information in accordance with the setting information stored in the slave display apparatus 1 connected to the output port 201, and controls the storage 407 to update the setting information stored therein with the master setting information received from the master display apparatus 1 connected to the input port 200.

Further, the controller 403 may not always transmit the master setting information to the connected slave display apparatus 1 even though connection with the output port 201 is detected, but transmit the master setting information in accordance with transmission conditions after determining the transmission conditions. For example, the transmission condition may include a forced transmission mode in which the master setting information based on the stored setting information is transmitted to the slave display apparatus 1 at the same time when another display apparatus 1 is connected to the output port 201, and a manual transmission mode in which a user interface for a user to select whether to transmit the master setting information when another display apparatus 1 is connected to the output port 201 and when a user selection is received, the master setting information is transmitted in accordance with the user's selection.

Further, the controller 403 may control the communicator 400 to perform pairing with the connected communicator 400 in accordance with requests and approvals for communication. That is, if the signal lines 20, 21, 22 and 23 are connected to the output port 201, the controller 403 makes a request for communication to the connected display apparatus 1, and does not transmit the master setting information to the slave display apparatus 1 connected to the output port 201 until receiving an approval for the communication from the connected display apparatus 1. Further, when the signal lines 20, 21, 22 and 23 are connected to the input port 200, the controller 403 determines whether to give an approval for communication in response to the communication request received through the communicator 400, transmits the communication approval to the master display apparatus 1 if it is determined to give the approval for the communication, and updates the setting information stored in the storage 407 based on the master setting information received from the master display apparatus 1.

Further, the controller 403 compares the master setting information received through the input port 200 with the setting information stored in the storage 407, and updates the stored setting information with the received master setting information only when the received master setting information is different from the stored setting information. This is to determine whether the stored setting information is different from the master setting information and update the setting information only when there is a difference.

The controller 403 may determine that the stored setting information and the received master setting information are different when a difference between them is greater than a preset first threshold critical range. The first critical range may include a case where there is a large difference between the same items of the setting information, and a case where there is a difference in an item to be necessarily modified in the setting information. The first critical range may be differently applied according to the items of the setting information. For example, if the received master setting information and the stored setting information are different in an image processing delay of 1 ms from each other, this may cause a problem of making the output of the whole image be unnatural and therefore the stored setting information is updated with the received master setting information. On the other hand, if the master setting information and the stored setting information are a little different in a sound volume from each other, it is not necessary to synchronize the sound volumes since a separate loudspeaker is used for outputting a sound in a public place. Like this, the first critical range may be differently applied between the sound volume and the image processing delay. In other words, the stored setting information is updated with the master setting information if the difference between two settings exceeds the first threshold range in order to improve a quality of the images displayed in the video wall.

Further, the controller 403 may determine that the received master setting information has an error when a difference between the stored setting information and the received master setting information is greater than a preset second threshold critical range. For example, if the received master setting information and the stored setting information are different in an image processing delay of 10 sec, the delay may be intended by a user, but it is difficult to exclude the delay caused by an unknown error. Therefore, if the difference is greater than the second critical range, it is determined that the received master setting information has an error. In addition, the controller 403 may control the communicator 400 to transmit information about this error to the master display apparatus 1. This error information may be just information for informing that the master display apparatus 1 has an error. Besides, this error information may contain a part of the setting information of the current display apparatus 1 in order to recover the set of the master display apparatus 1. As necessary, the second critical range may be greater than the first critical range. The error information is transmitted to the master display apparatus 1 if the difference between two settings exceeds the second threshold range which is greater than the first threshold range. In addition, after the transmitting of error information the stored setting information may be updated with the received master setting information.

Further, the controller 403 may update the stored setting information based on the received error information if receiving the error information from the slave display apparatus 1.

In this exemplary embodiment, the display apparatus 1 is nothing but an example. Therefore, the scope of the present inventive concept is not limited to the foregoing descriptions and the accompanying drawings. In the display apparatus 1 connecting with the plurality of display apparatuses 1 that are sequentially connected together to transmit an image signal, there may be various embodiments of the display apparatus 1 for exchanging data to synchronize the setting information.

Figure 5:
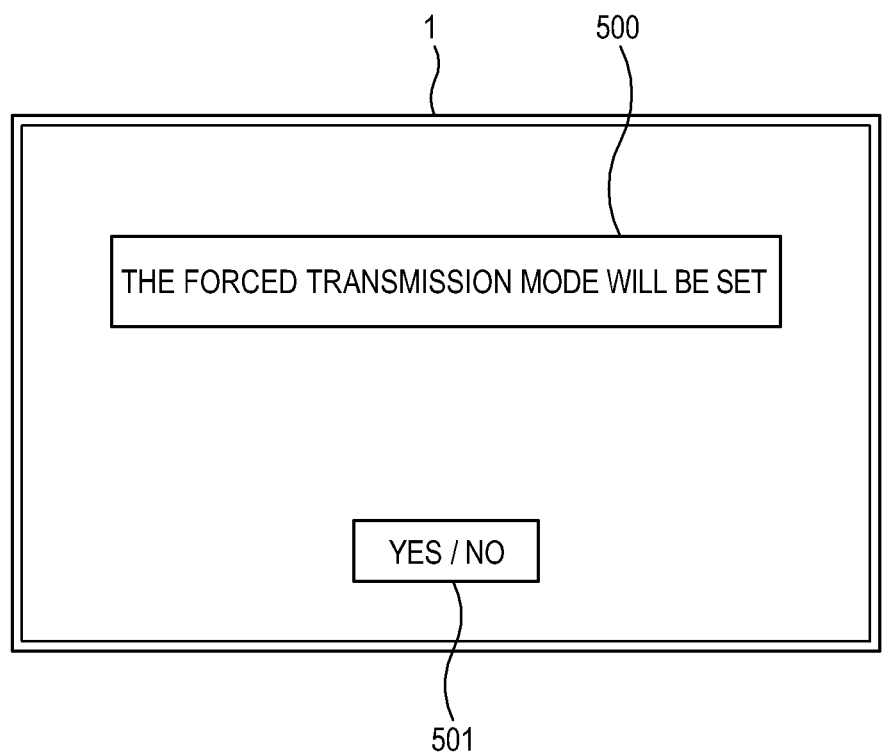
FIG. 5 shows an example of an operation in the display apparatus according to an exemplary embodiment.

FIG. 5 illustrates a display apparatus according to an exemplary embodiment, which displays a UI with menu items for setting the transmission conditions of the display apparatus. As described above, the setting information may include information about the transmission condition for transmitting the master setting information to the connected slave display apparatus 1. The controller 403 may control the display 401 to display the UI that includes a guide 500 for informing that the forced transmission mode for automatically transmitting the master setting information is set when another display apparatus 1 is connected to the output port 201, and menu items 501 corresponding to an approval and a refusal to the set, among the transmission conditions.

In this exemplary embodiment, the UI is nothing but an example. Therefore, there may be various UIs for allowing a user to set the transmission condition. For instance, the controller 403 may control the display 401 to display a UI with menu items corresponding to the transmission conditions of various modes so that a user can set the transmission condition by selection.

Figure 6:
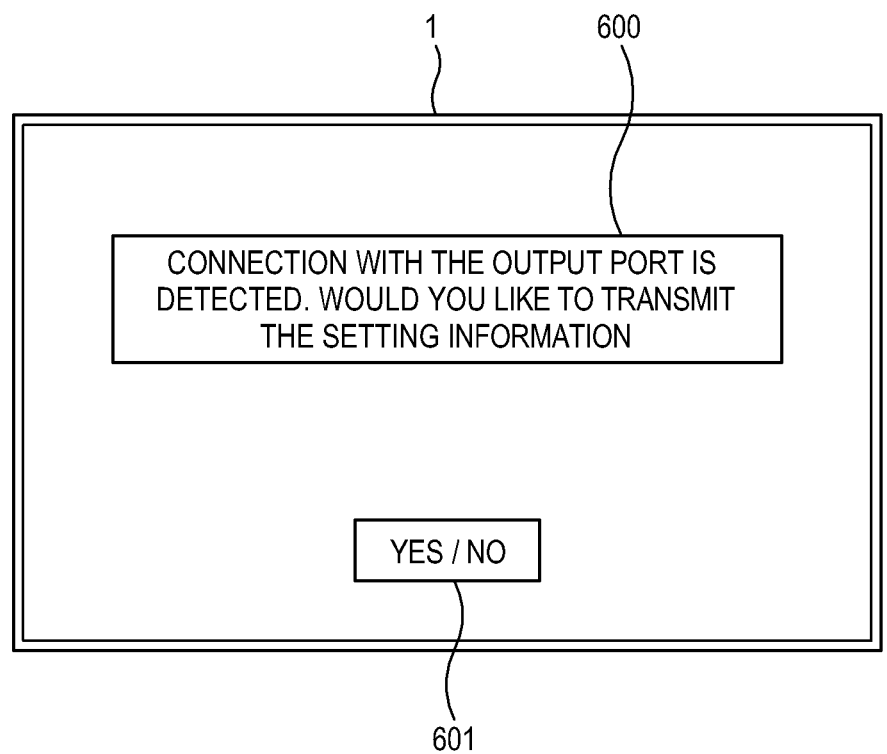
FIG. 6 shows an example of an operation in the display apparatus according to an exemplary embodiment.

FIG. 6 illustrates an example of the display apparatus according to an exemplary embodiment, which displays a UI for asking a user whether to transmit the master setting information if connection with the output port is detected after the manual transmission mode is set.

The controller 403 determines the transmission condition as described above if it is determined that another display apparatus 1 is connected to the output port 201, and transmits the master setting information based on the stored setting information to the slave display apparatus 1 connected display apparatus 1 if the transmission condition is set in the forced transmission mode. On the other hand, if the transmission condition is set in not the forced transmission mode but the manual transmission mode, the controller 403 may control the display 401 to display a UI that includes a guide 600 for informing a user that connection is detected in the output port and asking him/her whether to transmit the master setting information and menu items 601 corresponding to an approval and a refusal to the transmission.

In this exemplary embodiment, the UI is nothing but an example. Thus, there are various UIs for giving a guide about the transmission to a user. For example, the controller 403 may control the display 401 to display a UI that includes menu items corresponding to a verity of setting information so that a user may selectively transmit certain setting information. Thus, a user can send the setting information of the certain item to the slave display apparatus 1 by selecting the menu item.

Figure 7:
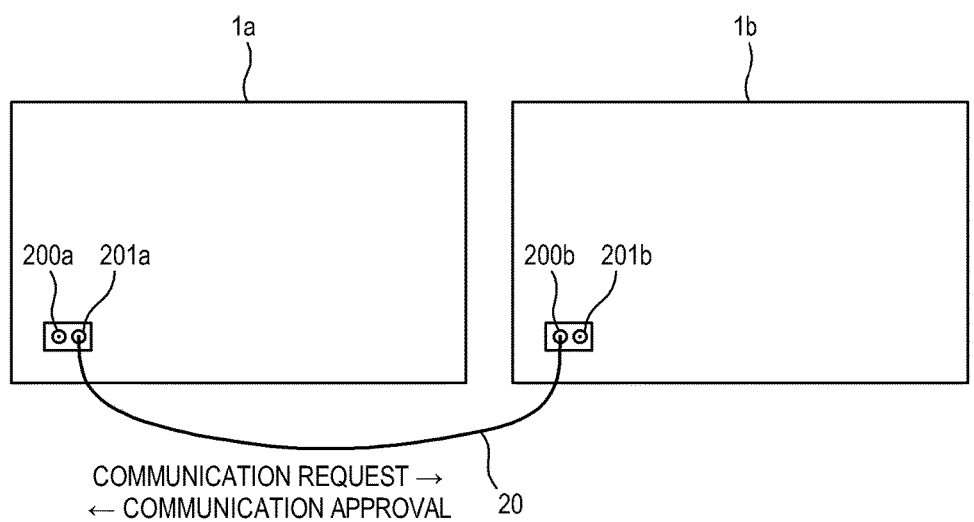
FIG. 7 illustrates a process of connection between the display apparatuses according to an exemplary embodiment.

FIG. 7 illustrates that a communication request and a communication approval are exchanged between the display apparatuses 1a-1b according to an exemplary embodiment. In this exemplary embodiment, a first display apparatus 1a operates as a master display apparatus 1a, and a second display apparatus 1b operates as a slave display apparatus 1b.

The first display apparatus 1a makes the communication request to the second display apparatus 1b if it is detected that the second display apparatus 1b is connected to the output port 201a, and transmits the master setting information based on the stored setting information to the second display apparatus 1b regarded as the slave display apparatus 1b if receiving the communication approval from the second display apparatus 1b.

The second display apparatus 1b determines the first display apparatus 1a is the master display apparatus 1a based on the communication request if it is detected that the first display apparatus 1a is connected to the input port 200b and the communication request is received from the first display apparatus 1a, transmits the communication approval to the master display apparatus 1a if it is determined that the first display apparatus 1a is the master display apparatus 1a, and updates the stored setting information with the master setting information received from the master display apparatus 1a.

If the ports for connection with the signal line 20 are reversed between the first display apparatus 1a and the second display apparatus 1b, the master and slave roles thereof are also reversed.

Alternatively, the communication request may further include a part of the master setting information. In this case, the second display apparatus 1b receives the communication request, and gives the communication approval if it is determined based on the received part of the master setting information that the stored setting information needs to be updated or the communication refusal if it is determined that the stored setting information does not need to be updated. As described above, the update may be needed if the received part of the master setting information is different from the stored setting information, or the difference is greater than the critical range.

Figure 8:
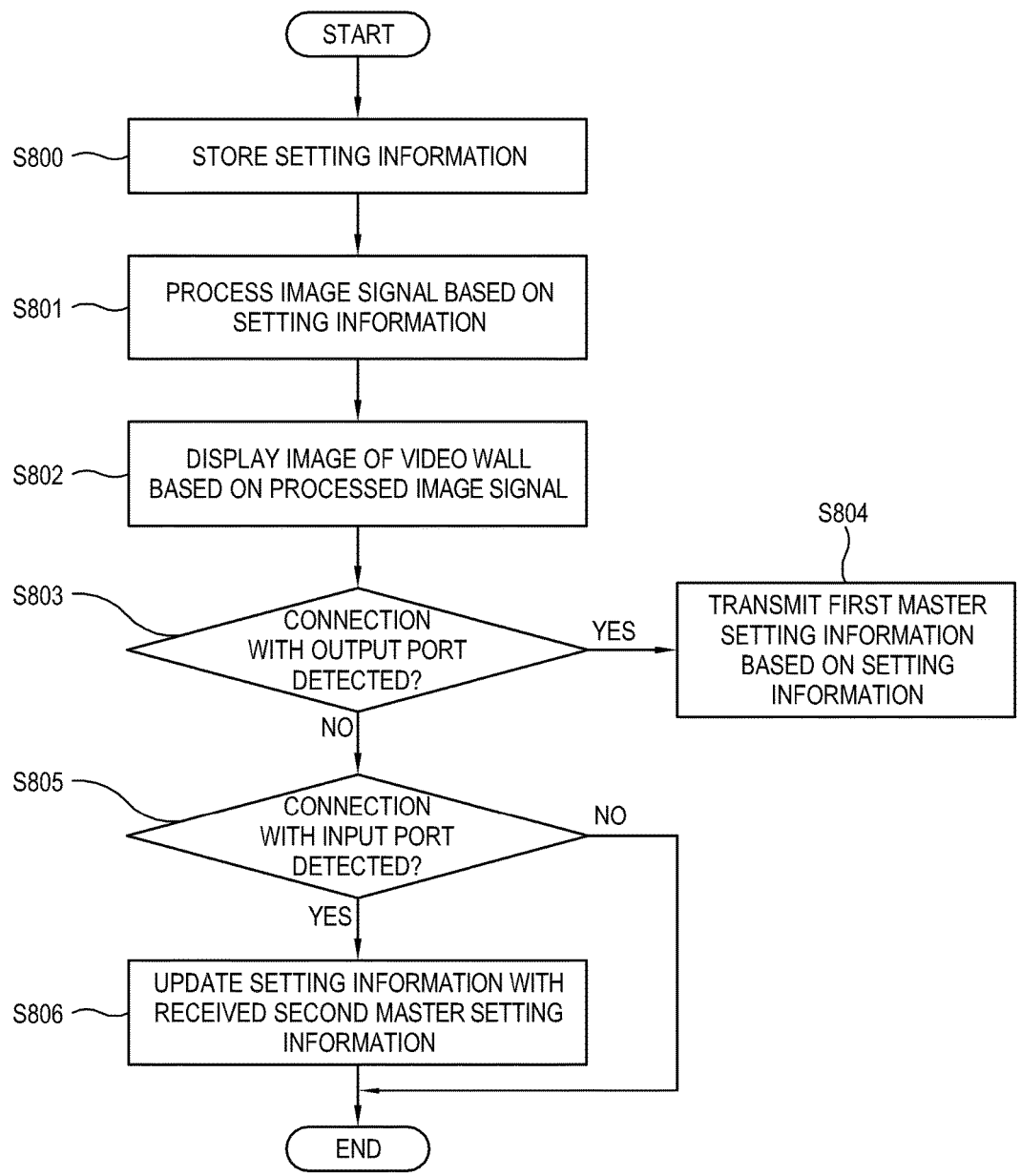
FIG. 8 is a flowchart of controlling the display apparatus according to an exemplary embodiment.

FIG. 8 shows a flowchart of controlling the display apparatus according to an exemplary embodiment. First, at operation S800, the setting information is stored in the storage 407. At operation S801, the signal processor 405 processes an image signal to display an image on the display 401 in accordance with the setting information. At operation S802, the controller 403 controls the display 401 to display an image of the video wall based on the processed image signal. At operation S803, the controller 403 detects whether there is connection with the output ports 201a, 201b, 201c and 201d. If it is detected that the external display apparatuses 1a, 1b, 1c and 1d are connected to the output ports 201a, 201b, 201c and 201d, at operation S804 the controller 403 determines the connected external display apparatuses 1a, 1b, 1c and 1d as the slave display apparatuses 1a, 1b, 1c and 1d and transmits the first master setting information based on the stored setting information to the slave display apparatuses 1a, 1b, 1c and 1d. At operation S805, the controller 403 determines whether there is connection with the input port 200a, 200b, 200c and 200d. If it is determined that the external display apparatuses 1a, 1b, 1c and 1d are connected to the input port 200a, 200b, 200c and 200d, at operation S806 the controller 403 determines the connected external display apparatuses 1a, 1b, 1c and 1d as the master display apparatuses 1a, 1b, 1c and 1d and updates the stored setting information with the second master setting information received from the master display apparatuses 1a, 1b, 1c and 1d.

Figure 9:
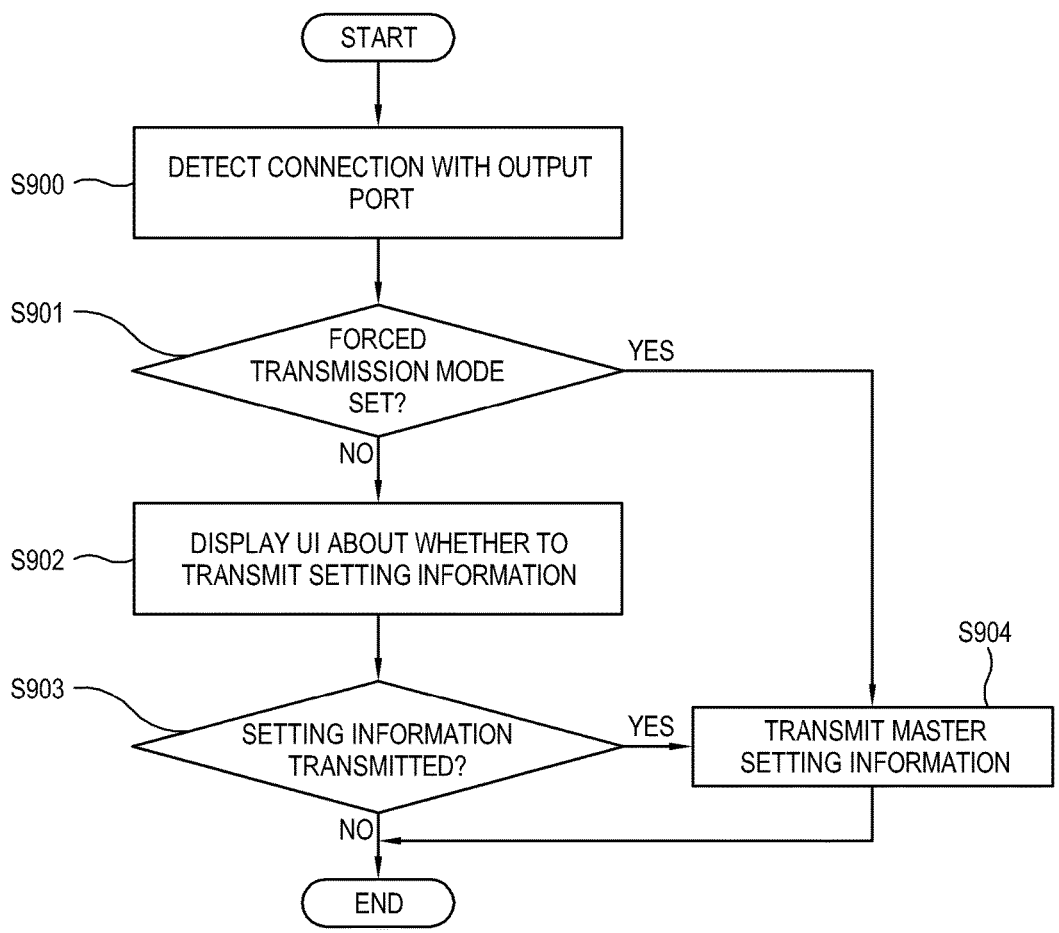
FIG. 9 is a flowchart of controlling the display apparatus according to an exemplary embodiment.

FIG. 9 is a flowchart of operating the display apparatus according to an exemplary embodiment in accordance with the transmission conditions. First, if at operation S900 the controller 403 detects that the external display apparatuses 1a, 1b, 1c and 1d are connected to the output ports 201a, 201b, 201c and 201d, at operation S901 the controller 403 determined whether the forced transmission mode is set. If the forced transmission mode is not set, at operation S902 the controller 403 controls the display 401 to display a UI with menu items for asking a user whether to transmit the setting information. If a user selects the transmission of the setting information through the UI, at operation S904 the controller 403 determines the connected external display apparatuses 1a, 1b, 1c and 1d as the slave display apparatuses 1a, 1b, 1c and 1d and controls the communicator 400 to transmit the master setting information based on the stored setting information to the slave display apparatuses 1a, 1b, 1c and 1d.

Figure 10:
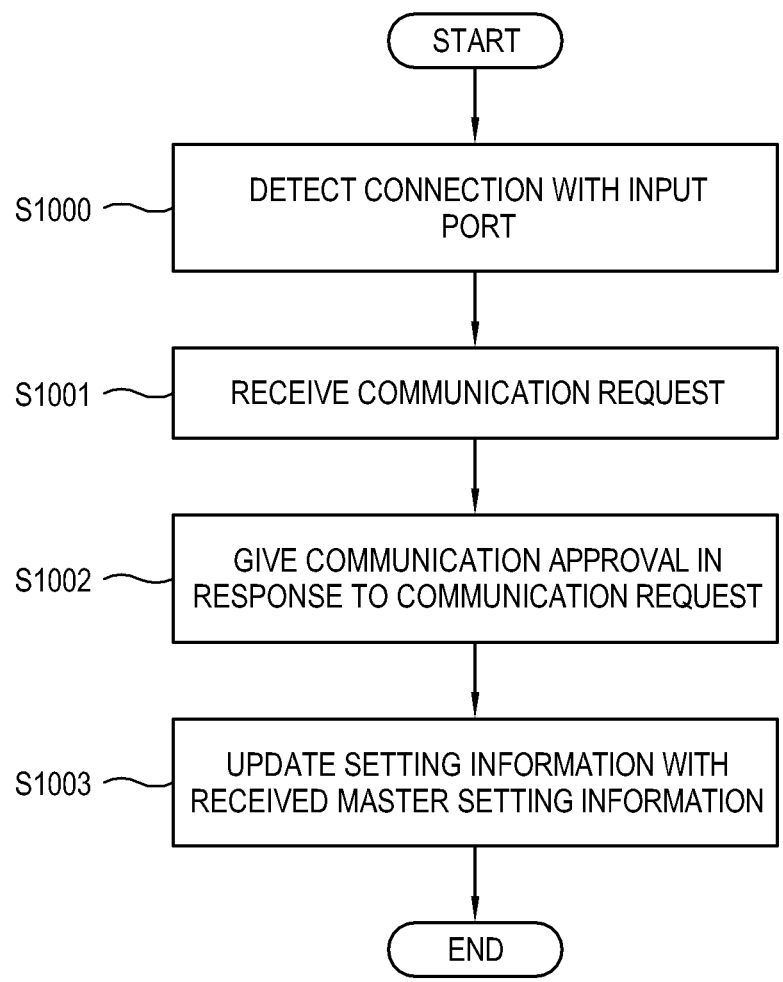
FIG. 10 is a flowchart of controlling the display apparatus according to an exemplary embodiment.

FIG. 10 is a flowchart of operating the display apparatus according to an exemplary embodiment when connection with the input port is detected and a communication request is received. First, at operation S1000 the controller 403 detects that the external display apparatuses 1a, 1b, 1c and 1d are connected to the input port 200a, 200b, 200c and 200d. At operation S1001, if receiving a communication request from the connected external display apparatuses 1a, 1b, 1c and 1d, at operation S1002 the controller 403 determines the connected external display apparatuses 1a, 1b, 1c and 1d as the master display apparatuses 1a, 1b, 1c and 1d and gives a communication approval to the master display apparatuses 1a, 1b, 1c and 1d based on the received communication request. At operation S1003, the controller 403 updates the stored setting information with the master setting information received from the master display apparatuses 1a, 1b, 1c and 1d.

Figure 11:
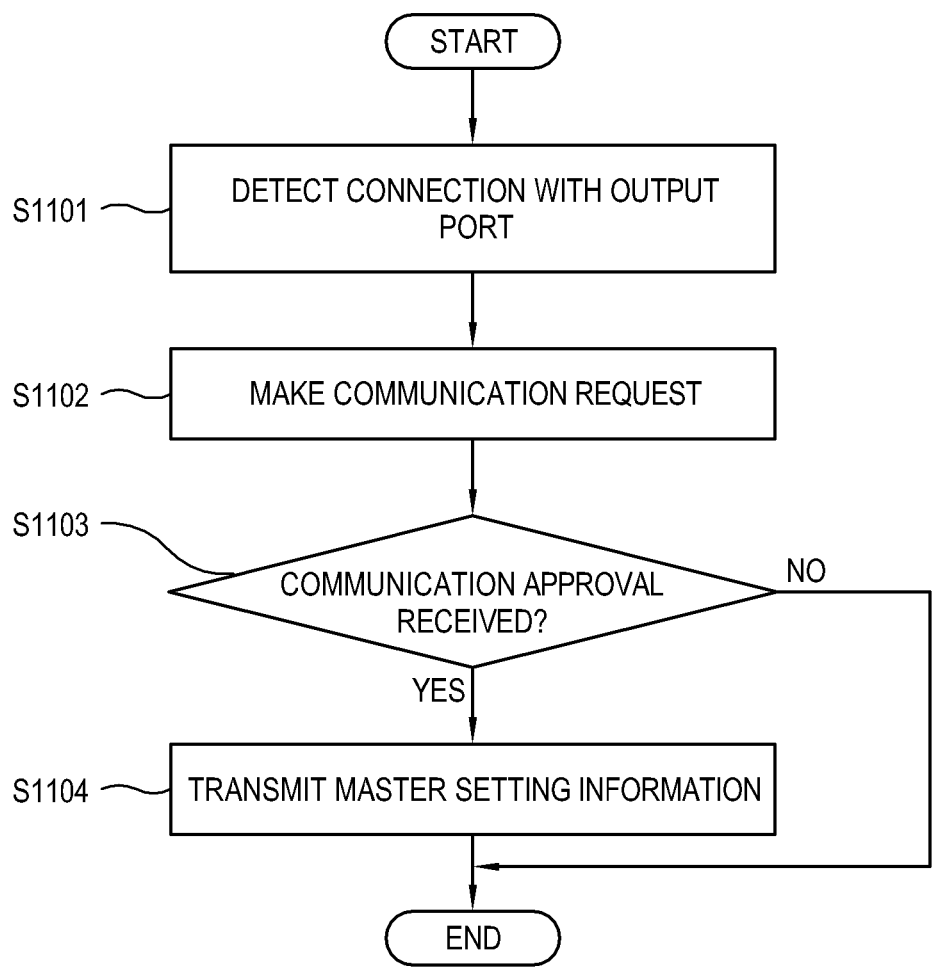
FIG. 11 is a flowchart of controlling the display apparatus according to an exemplary embodiment.

FIG. 11 is a flowchart of operating the display apparatus according to an exemplary embodiment, which transmits the communication request when connection with the output port is detected. First, at operation S1101 the controller 403 detects that the external display apparatuses 1a, 1b, 1c and 1d are connected to the output ports 201a, 201b, 201c and 201d. At operation S1102 the controller 403 controls the communicator 400 to transmit the communication request to the connected external display apparatuses 1a, 1b, 1c and 1d. At operation S1103, it is detected whether the communication approval is received from the external display apparatuses 1a, 1b, 1c and 1d. If the communication approval is received, at operation S1104 the controller 403 determines the external display apparatuses 1a, 1b, 1c and 1d making the communication approval as the slave display apparatuses 1a, 1b, 1c and 1d, and transmits the master setting information based on the setting information to the slave display apparatuses 1a, 1b, 1c and 1d.

Figure 12:
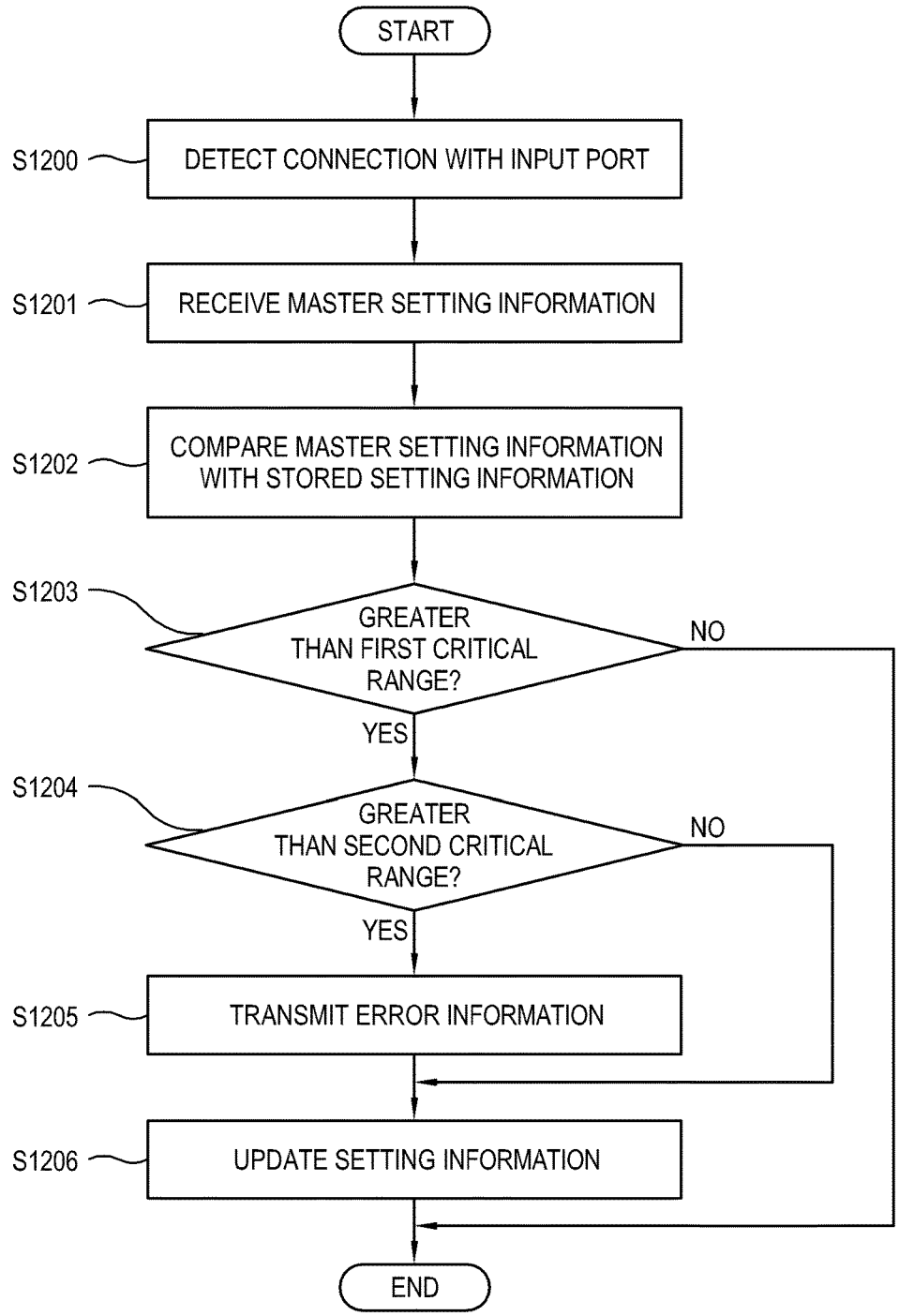
FIG. 12 is a flowchart of controlling the display apparatus according to an exemplary embodiment.

FIG. 12 is a flowchart of operating the display apparatus according to an exemplary embodiment, which compares the received master setting information and the stored setting information. First, if at operation S1200 the controller 403 detects that the external display apparatuses 1a, 1b, 1c and 1d are connected to the input port 200a, 200b, 200c and 200d, the connected external display apparatuses 1a, 1b, 1c and 1d are regarded as the master display apparatuses 1a, 1b, 1c and 1d. if at operation S1201 the master setting information is received from the master display apparatuses 1a, 1b, 1c and 1d, at operation S1202 the controller 403 compares the received master setting information and the stored setting information. At operation S1203, it is determined whether a difference between the master setting information and the stored setting information is greater than the first critical range. If it is determined that the difference does not exceed the first critical range, the controller 403 does not update the setting information with the received master setting information. On the other hand, if it is determined that the difference exceeds the first critical range, at operation S1204 the controller 403 further determines whether the difference exceeds the second critical range. If it is determined that the difference exceeds the second critical range, at operation S1205 the controller 403 transmits error information to the master display apparatuses 1a, 1b, 1c and 1d, and at operation S1206 the controller 403 updates the stored setting information with the received master setting information. However, although not shown in FIG. 12, the operation may end after the transmitting of error information without updating the stored setting information in order to correct the error. On the other hand, if it is determined that the difference does not exceed the second critical range, at operation S1206 the controller 403 updates the stored setting information with the received master setting information.

Figure 13:
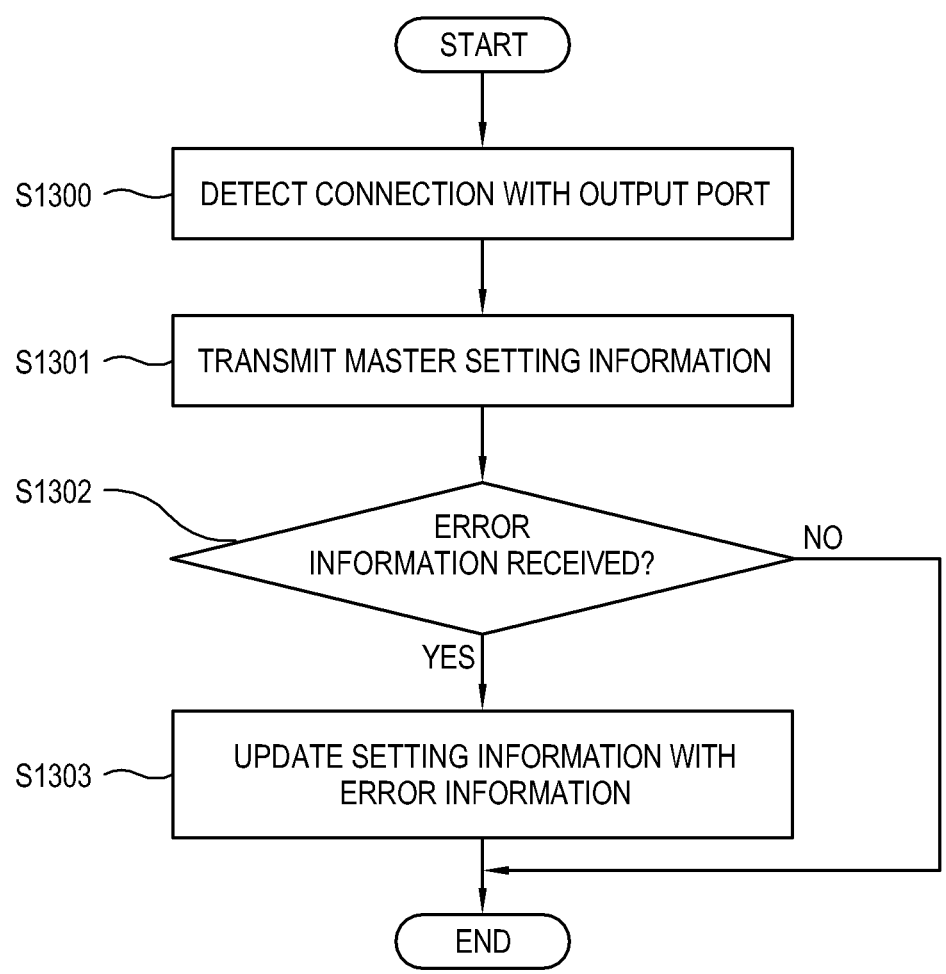
FIG. 13 is a flowchart of controlling the display apparatus according to an exemplary embodiment.

FIG. 13 is a flowchart of operating the display apparatus according to an exemplary embodiment, which receives the error information from the slave display apparatus.

First, if at operation S1300 the controller 403 detects that the external display apparatuses 1a, 1b, 1c and 1d are connected to the output ports 201a, 201b, 201c and 201d, the controller 403 determines the connected external display apparatuses 1a, 1b, 1c and 1d as the slave display apparatuses 1a, 1b, 1c and 1d, and at operation S1301 transmits the master setting information to the stored setting information. At operation S1302 it is determined whether the error information is received from the slave display apparatuses 1a, 1b, 1c and 1d. If it is determined that the error information is received from the slave display apparatuses 1a, 1b, 1c and 1d, at operation S1303 the controller 403 updates the stored setting information with the received error information.

As described above, according to an exemplary embodiment, the setting information received from the master display apparatus is used to update the stored setting information, and the setting information is transmitted to the slave display apparatus based on the stored setting information, thereby easily and accurately synchronizing the setting information between the plurality of display apparatuses that are sequentially connected together.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus used for a video wall formed by a plurality of display apparatuses that are sequentially connected to one another, the display apparatus comprising:
  a communicator comprising an output port to which a first display apparatus of the plurality of display apparatuses is connectable and an input port to which a second display apparatus of the plurality of display apparatuses is connectable, the communicator configured to receive an image signal of the video wall from the second display apparatus through the input port and to transmit the image signal to the first display apparatus through the output port so that the image signal is sequentially transmitted for the plurality of display apparatuses of the video wall;
  a storage configured to store setting information of the display apparatus to display an image of the video wall;
  a signal processor configured to process an image signal;
  a display configured to display the image of the video wall based on the processed image signal; and
  a processor configured to:
    control the communicator to receive master setting information from the second display apparatus which is connected to the input port;
    identify whether the received master setting information is different from the stored setting information;
    control the storage to update the stored setting information with the received master setting information based on identifying that the received master setting information is different from the stored setting information;
    control the signal processor to process the received image signal from the second display apparatus base on the updated setting information; and
    control the display to display the image of the video wall based on the updated setting information, and control the communicator to transmit the updated setting information to the first display apparatus which is connected to the output port.

2. The display apparatus according to claim 1, wherein the setting information comprises information about at least one of image quality, a delay in image processing and color calibration of a display panel.

3. The display apparatus according to claim 1, wherein
  the setting information comprises position information about a relative arranged position of the display apparatus in the video wall, and
  the processor controls the signal processor to process the image signal to display a part of the image of the video wall image based on the position information.

4. The display apparatus according to claim 1, wherein the processor controls the updated setting information to be selectively transmitted to the first display apparatus when the processor detects that the first display apparatus is connected to the output port and a third display apparatus which is connected to the first display apparatus.

5. The display apparatus according to claim 4, wherein the setting information comprises information about a transmission condition, and the processor determines whether to transmit the updated setting information based on the information about the transmission condition.

6. The display apparatus according to claim 5, wherein the processor controls the display to display a first user interface (UI) with menu items related to the transmission condition, and sets the transmission condition in accordance with a user's input using the first UI.

7. The display apparatus according to claim 6, wherein the processor controls the display to display a second UI with a menu item for asking a user whether to transmit the updated setting information, when the processor detects that the first display apparatus is connected to the output port and the transmission condition is set not to automatically transmit the updated setting information.

8. The display apparatus according to claim 1, wherein the processor controls the communicator to make a first communication request to the first display apparatus when the processor detects that the first display apparatus is connected to the output port, designates the first display apparatus as a slave display apparatus when a first communication approval is received through the communicator, and transmits the updated setting information to the slave display apparatus.

9. The display apparatus according to claim 1, wherein the processor designates the second display apparatus as the master display apparatus and controls the communicator to transmit a second communication approval to the master display apparatus, when the processor detects that the second display apparatus is connected to the input port and a second communication request is received from the second display apparatus through the communicator.

10. The display apparatus according to claim 8, wherein the first communication request and the second communication request comprise a part of the updated setting information and a part of the master setting information, respectively.

11. The display apparatus according to claim 1, wherein the processor identifies whether the received first master setting information is different from the stored setting information by comparing the received first master setting information and the stored setting information, and updates the stored setting information with the received master setting information based on identifying that that the received master setting information is different from the stored setting information.

12. The display apparatus according to claim 11, wherein the processor compares the received master setting information and the stored setting information, and identifies that received master setting information and the stored setting information are different when a difference between the received master setting information and the stored setting information is greater than a first critical range.

13. The display apparatus according to claim 11, wherein the processor compares the master setting information and the stored setting information, and transmits first error information based on the stored setting information to the master display apparatus when the difference between the received master setting information and the stored setting information is greater than a second critical range.

14. The display apparatus according to claim 1, wherein the processor updates the stored setting information with the second error information when second error information is received from the slave display apparatus through the communicator.

15. A method of controlling a display apparatus which is used for a video wall formed by a plurality of display apparatuses that are sequentially connected to one another, the display apparatus comprising an output port to which a first display apparatus of the plurality of display apparatuses is connectable and an input port to which a second display apparatus of the plurality of display apparatuses is connectable, the method comprising:

storing setting information of the display apparatus to display an image of the video wall;

processing an image signal received from the second display apparatus based on the stored setting information;

displaying the image of the video wall based on the processed image signal;

receiving master setting information from the second apparatus when the second display apparatus is connected to the input port;

identifying whether the received first master setting information is different from the stored setting information;

updating the stored setting information with the received master setting information based on the identifying that the received master setting information is different from the stored setting information;

displaying the image of the video wall based on the updated setting information; and transmitting the updated setting information to the first display apparatus when the processor detects that the first display apparatus is connected to the output port.

16. The method according to claim 15, wherein the setting information comprises information about at least one of image quality, a delay in image processing and color calibration of a display panel.

17. The method according to claim 15, wherein the setting information comprises position information about a relative arranged position of the display apparatus in the video wall, and the displaying the image of the video wall comprises processing the image signal to display a part of the image of the video wall image based on the position information.

18. The method according to claim 15, wherein the transmitting the master setting information comprises:

selectively transmitting the updated setting information based on the stored setting information to the first display apparatus when the processor detects that the first display apparatus is connected to the output port and a third display apparatus which is connected to the first display apparatus.

19. The method according to claim 18, wherein the setting information comprises information about a transmission condition, and the selectively transmitting of the updated setting information comprises: determining whether to transmit the updated setting information based on the information about the transmission condition.

20. The method according to claim 19, wherein the determining whether to transmit the updated setting information based on the information about the transmission condition comprises:

displaying a first user interface (UI) with menu items related to the transmission condition; and setting the transmission condition in accordance with a user's input using the first UI.

\* \* \* \* \*